United States Patent
Knoplioch et al.

(10) Patent No.: US 7,191,101 B2
(45) Date of Patent: Mar. 13, 2007

(54) METHOD OF SEMIAUTOMATIC SEGMENTATION FOR THE ESTIMATION OF THREE-DIMENSIONAL VOLUMES

(75) Inventors: Jérôme Knoplioch, Neuilly-sur-Seine (FR); Eric Stefani, Boulogne Billancourt (FR)

(73) Assignee: GE Medical Systems SA (FR)

( * ) Notice: Subject to any disclaimer, the term of this patent is extended or adjusted under 35 U.S.C. 154(b) by 0 days.

(21) Appl. No.: 09/368,201

(22) Filed: Aug. 4, 1999

(65) Prior Publication Data

US 2002/0026299 A1 Feb. 28, 2002

Related U.S. Application Data

(63) Continuation of application No. PCT/FR98/02599, filed on Dec. 2, 1998.

(30) Foreign Application Priority Data

Dec. 10, 1997 (FR) .................. 97 15639

(51) Int. Cl.
G06F 7/60 (2006.01)
A61B 6/00 (2006.01)
(52) U.S. Cl. ............................. 703/2; 378/4
(58) Field of Classification Search .......... 33/1 V, 33/546, 547; 702/156, 155, 159; 434/187; 356/379, 376; 382/128, 203; 345/423; 703/1, 703/2; 600/507; 378/4
See application file for complete search history.

(56) References Cited

U.S. PATENT DOCUMENTS

| | | | |
|---|---|---|---|
| 5,214,752 A * | 5/1993 | Meshkat et al. ............ 345/423 |
| 5,307,292 A | 4/1994 | Brown | |
| 5,345,490 A * | 9/1994 | Finnigan et al. ............... 378/4 |
| 5,367,615 A * | 11/1994 | Economy et al. ........... 345/429 |
| 5,390,035 A * | 2/1995 | Kasson et al. .............. 358/518 |
| 5,435,310 A | 7/1995 | Sheehan | |
| 5,440,674 A * | 8/1995 | Park ........................... 345/423 |
| 5,522,019 A * | 5/1996 | Bala et al. ................... 345/424 |
| 5,596,504 A * | 1/1997 | Tata et al. ................... 700/120 |
| 5,649,079 A * | 7/1997 | Holmes ...................... 345/423 |
| 5,689,577 A * | 11/1997 | Arata .......................... 382/128 |
| 5,774,696 A * | 6/1998 | Akiyama ................ 395/500.21 |
| 5,782,762 A * | 7/1998 | Vining ........................ 600/407 |
| 5,798,764 A * | 8/1998 | Akiyama .................... 345/423 |

(Continued)

OTHER PUBLICATIONS

CS 426 Assignment 4; pp. 1-5, obtained from priceton.edu/courses/archive/fall96, 1996.*

(Continued)

*Primary Examiner*—Hugh Jones
(74) *Attorney, Agent, or Firm*—Cantor Colburn LLP

(57) ABSTRACT

Method of estimation and segmentation of the volume of a three-dimensional object in medical imagery, in which:
one defines a given number of base points constituting a first three-dimensional shape defined by facets;
each facet of the first shape being defined by three segments, the segments are divided by defining second order points adapted to the contour of the object, so as to constitute a second three-dimensional shape closer to the contour of the object than the first shape;
each segment is iteratively divided into subsegments adjusted by defining third order points adapted to the contour of the object, so as to constitute a third three-dimensional shape closer to the contour of the object than the second shape;
then, the volume of the third three-dimensional shape is calculated.

23 Claims, 4 Drawing Sheets

U.S. PATENT DOCUMENTS 5,905,500 A * 5/1999 Kamen et al. .............. 345/419
5,936,869 A * 8/1999 Sakaguchi et al. ..... 395/500.01
6,046,744 A * 4/2000 Hoppe ........................ 345/419
6,108,006 A * 8/2000 Hoppe ........................ 345/423

OTHER PUBLICATIONS

Zorin et al.; Interpolating subdivision for meshes with arbitrary topology; pp. 1-4; Proc. Siggraph, 1996.*

* cited by examiner

METHOD OF SEMIAUTOMATIC SEGMENTATION FOR THE ESTIMATION OF THREE-DIMENSIONAL VOLUMES

This is a continuation application of International Application No. PCT/FR98/02599 filed Dec. 2, 1998.

BACKGROUND OF THE INVENTION

The present invention concerns the estimation of the volume of a three-dimensional object, notably, in medical imagery.

In some medical imagery applications, there is a need to know precisely the volume of three-dimensional objects like, for example, an organ or an organ part of the human body.

It is possible through such methods to approximate the volume of an object by knowing the contour of that object along different sections, the outline between the sections then being modeled by a continuous slope. The three-dimensional object is thus modeled by a plurality of thin truncated cone-shaped volumes. However, this method requires an operator to plot the contour of the object, which demands slow and painstaking work.

BRIEF SUMMARY OF THE INVENTION

The present invention seeks to solve the problems of the above procedure by a method that is simple, easy to use and enables the desired precision to be obtained in a short time.

The method 100 (best seen by referring to FIG. 6) is intended for estimation of the volume of a three-dimensional object in medical imagery, a contour of the object being known by means of a plurality of films taken 105 in section.

The method comprises the following steps:

define 110 a given number of base points constituting a first three-dimensional shape defined by facets whose vertices are the base points;

each facet of the first shape being defined 115 by three segments and each segment being common to two adjacent facets, the segments are divided by creating 120 second rank points adapted to the contour of the object, so as to constitute a second three-dimensional shape closer to the contour of the object than the first shape, the creation of a second rank point resulting in the creation of two new facets and three new segments;

each segment is iteratively divided into subsegments adjusted by defining 125 third rank points adapted to the contour of the object, so as to constitute a third three-dimensional shape closer to the contour of the object than the second shape, the creation of a third rank point resulting in the creation of two new facets and three new segments; and then, the volume of the third three-dimensional shape is calculated 130.

Thus, only points have to be defined and not a contour, which facilitates the work.

In one embodiment of the invention, the images were taken along parallel sections.

In another embodiment of the invention, a plurality of images is treated to supply a description of the three-dimensional volume.

Each segment is advantageously divided into two.

In one embodiment of the invention, the position of each second rank point is proposed as a function of the position of the first two adjacent points or vertices. Each second rank point can thus be proposed as a function of the orientation of the perpendiculars to the first two adjacent points or vertices.

In one embodiment of the invention, the segments are divided into subsegments until the change of volume resulting from a given division is negligible. One can thus choose a change of threshold volume below which the iterative division into subsegments is stopped. The threshold of change of volume corresponds to the desired precision of the method.

In one embodiment of the invention, six first base points, available on top and bottom, in front and back and on each side edge of the object, are defined.

A calculation of distribution of the density of the object in space can be made subsequent to calculation of the estimated volume of the object.

Any point of the three-dimensional shapes can be modified manually, for example, to adapt it to an irregularity in the relief of the object, such as a hollow or a boss. A different weighting is given to the points in order to approximate the real contour of the object as closely as possible. A modification of a first base point will result in a corresponding modification of the set of neighboring points. On the other hand, a modification of a third point of the third shape will not result in any modification of the first and second adjacent points and may slightly modify the position of the third adjacent points. Improvements of the different shapes leading to bringing them closer to the real contour of the three-dimensional object can thus be carried out very flexibly.

Similarly, to preserve a great flexibility of use, any point, including third rank, can be defined manually.

BRIEF DESCRIPTION OF THE DRAWINGS

The present invention will be better understood and other advantages will emerge from the detailed description of an embodiment taken nonlimitatively and illustrated by the attached drawings, wherein.

DETAILED DESCRIPTION OF THE INVENTION

Figure 1:
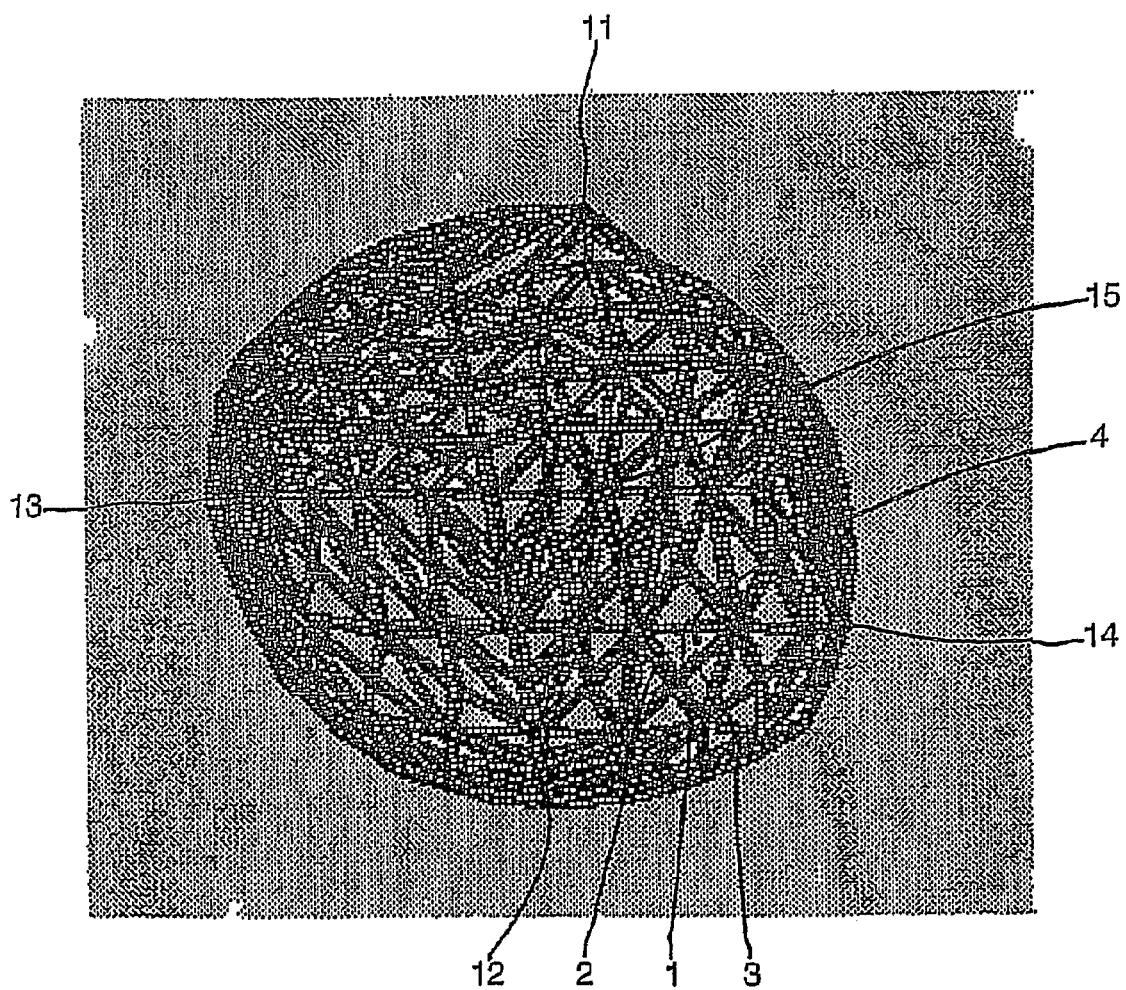
FIG. 1 is a view in perspective of a final shape according to an embodiment of the invention.

As can be seen in FIG. 1, a final shape approximating a three-dimensional object is formed by a plurality of facets defined by three segments, for example, segments 1 to 3, defining a flat triangular surface 4. The volume of the three-dimensional object, not represented, is thus approximated by means of triangular surfaces, the coordinates of whose vertex points are known. The volume of the shape can thus be calculated.

An operator begins by defining six points of the object, an upper point 11, a lower point 12, a left side point 13, a right side point 14, a front point 15 and a back point not visible in FIG. 1. This first shape thus roughly defines the three-dimensional object, and these six points must be positioned precisely, for on their definition depends that of the future adjacent points. In order to obtain a satisfactory definition, it may be necessary to check their positioning on different sections of the object.

After having defined the six first points, an oblique view is added to the existing view, making it possible by orientation and centering to define additional points.

The additional points can then be defined at the intersection of the perpendicular to one of the segments of the base volume, the perpendicular being calculated from the facets and points forming that segment, and from the edge of the three-dimensional object studied. The perpendicular to each of the segments provides a plurality of subsegments for each segment. A number of second points constituting a second shape is defined manually or automatically. When the change of volume resulting from the definition of second points becomes less than a threshold, the definition of points can then be continued automatically, proceeding with the segmentation of existing facets until a sufficient correspondence with the three-dimensional object studied is obtained, thus constituting a third shape. The definition of points can, nevertheless, be pursued manually.

When the final volume is defined, points whose definition does not satisfactorily correspond to an irregularity in the three-dimensional object studied, notably, a hollow or a protuberance, can be modified. The point is then displaced according to the perpendicular to the facet to which the point belongs, the perpendicular being calculated from the facets.

The points adjacent to the points modified will also be modified in order to maintain the regularity of the volume defined, by taking into account the belonging of the point to the first, second or third shape. The displacement of a point of the first shape results in a corresponding displacement of all the adjacent points. The displacement of a point of the third shape does not result in displacement of adjacent points of the first and second shapes.

Figure 2:
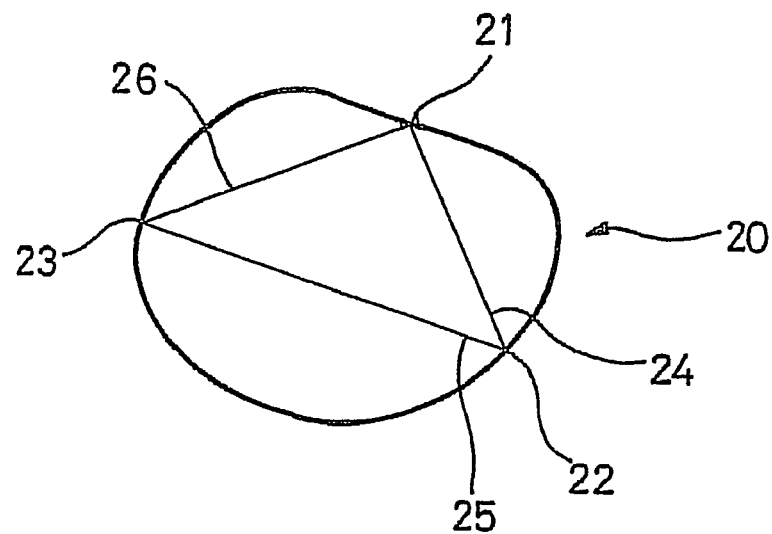
FIGS. 2 and 3 are two-dimensional schematic views of to better understand the method or the invention.
Figure 3:
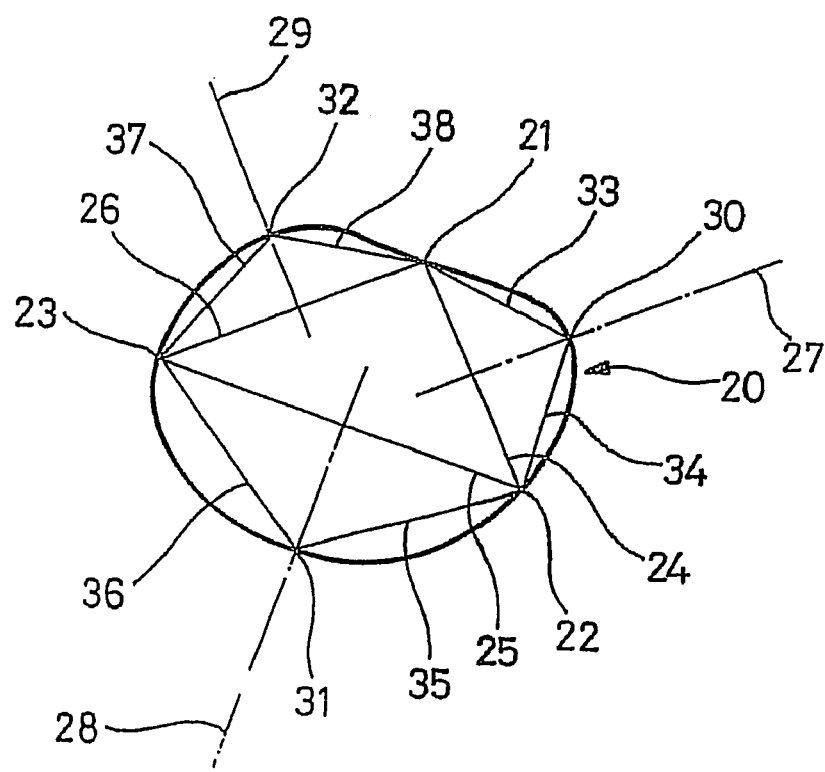

FIGS. 2 and 3 show schematically, in two dimensions as an understanding of the process of, definition of the points. From a contour 20, first base points 21 to 23 are defined and make it possible roughly to define the contour 20. The straight-line segments 24 to 26 joining the first base points 21 to 23 are then defined. The perpendiculars 27 to 29 to those segments 24 to 26 are then calculated. Second points 30 to 32 more precisely approximating the contour 20 can then be defined by being displaced along perpendiculars 27 to 29. The segments 33 to 38 joining points 21 to 23 and 30 to 32 are then defined, which makes it possible to reproduce the previous stages manually, semiautomatically or automatically until the desired precision is obtained.

Figure 4:
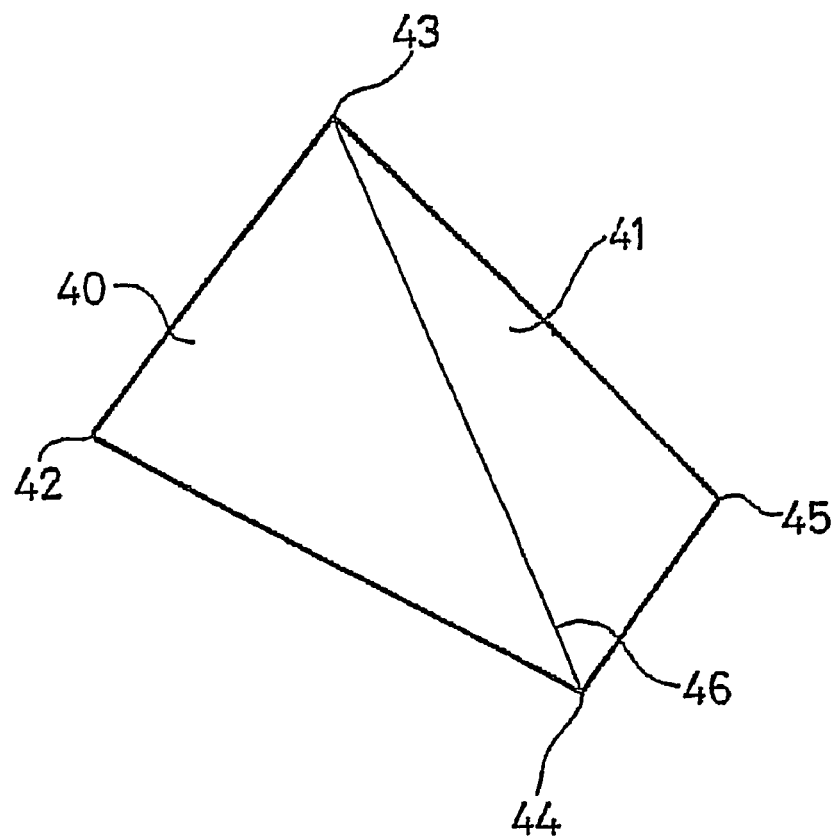
FIGS. 4 and 5 are three-dimensional schematic views of the method according to an embodiment of the invention.
Figure 5:
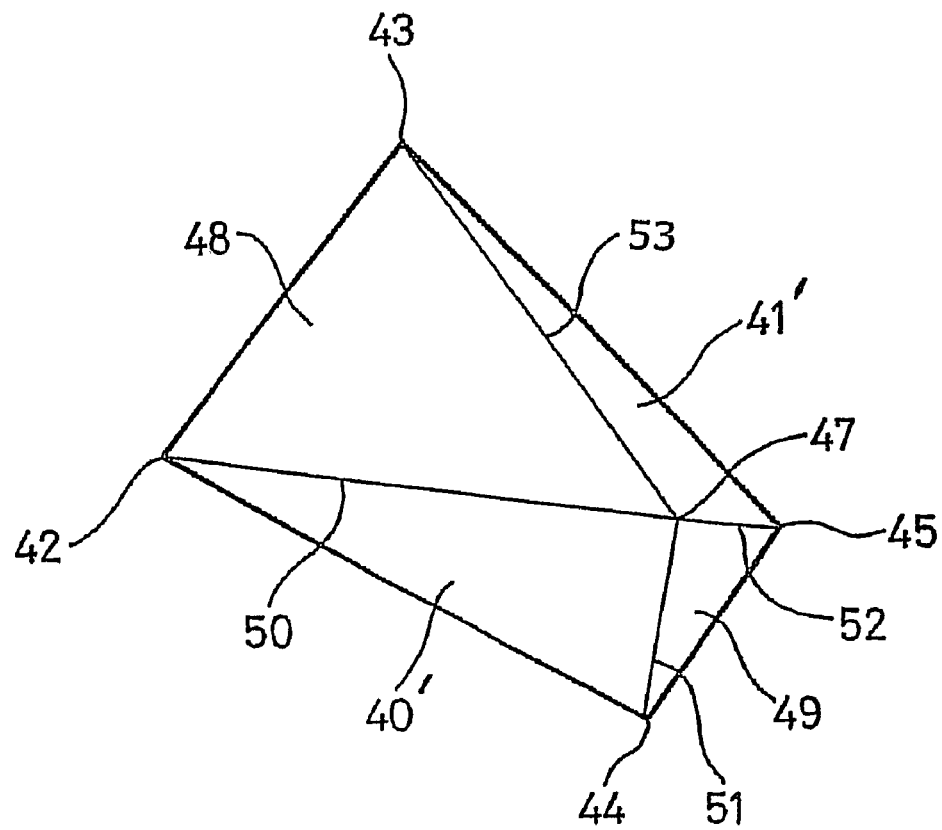
Figure 6:
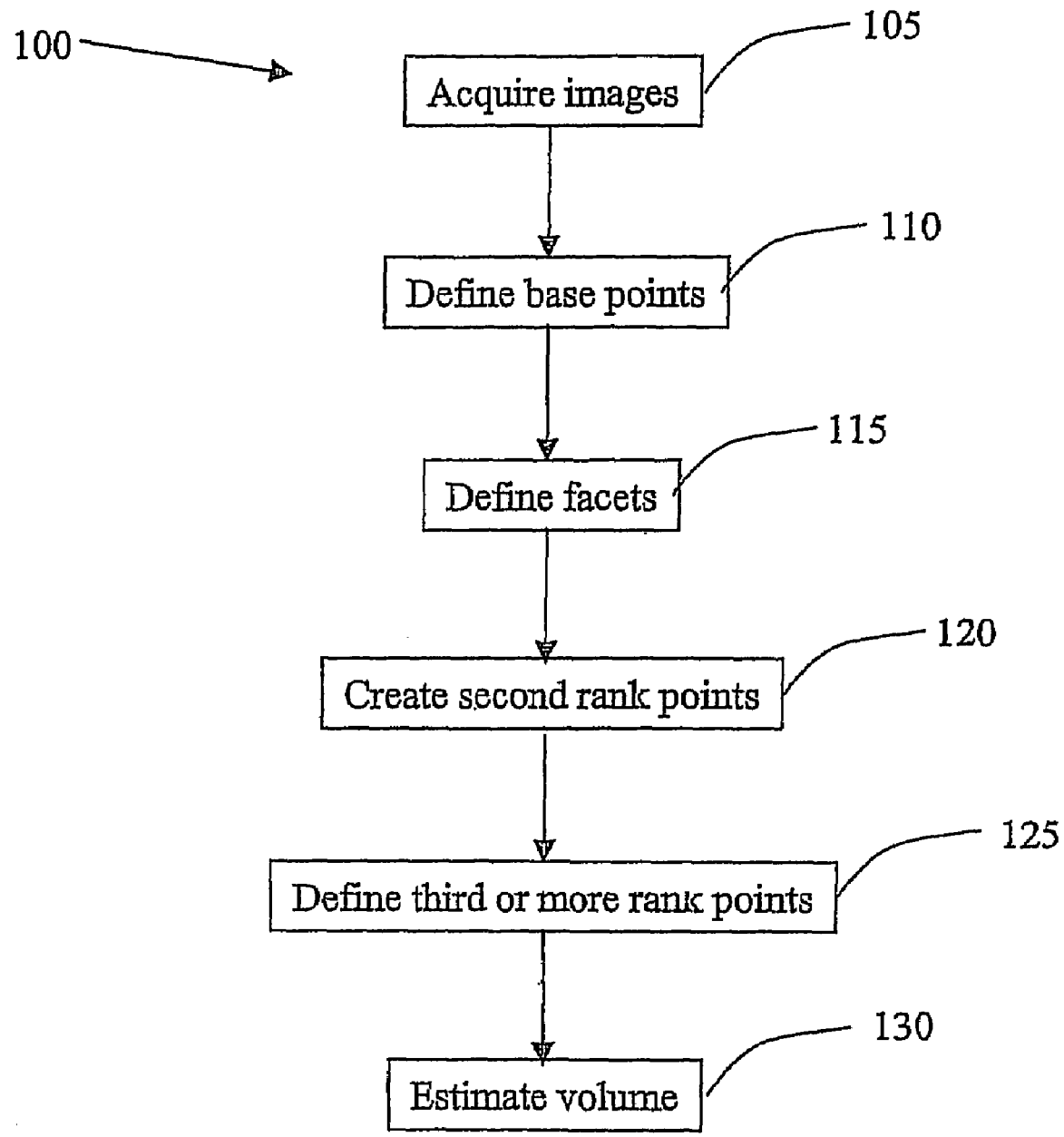
FIG. 6 illustrates a method in flowchart form in accordance with an embodiment of the invention.

FIGS. 4 and 5 show schematically, in three dimensions, the process of definition of the points. Two facets 40 and 41 belonging to a contour are represented. Facet 40 is limited by base points 42, 43 and 44. Facet 41 is limited by base points 43, 44 and 45. Base points 43 and 44 are therefore common to facets 40', 41', 40 and 41 define a segment 46. A second-order point 47, which is closer to the contour of the three-dimensional object is next defined in FIG. 5, which results in the creation of additional facets 48 and 49 and additional segments 50 to 53.

In the invention, a method of estimation of the volume of a three-dimensional object suited to X-ray imagery is made available, which is easy to use, for there is only a small number of points to be defined on the edge of the three-dimensional object, as is easy to check, which guarantees a good approximation of the contour in rapid time, since the automatic definition phase can be carried out in a few seconds and is readily reproducible, insofar as it is based on the definition of a small number of points on the contour of the object.

Various modifications in structure and/or steps and/or function may be made by one skilled in the art to the disclosed embodiments without departing from the scope and extent of the invention.

What is claimed is:

1. A method of estimating the volume of a three-dimensional object having a known contour, the object being an organ or organ part of a body, the method comprising:
   acquiring a plurality of two-dimensional images of the organ or organ part that defines the object;
   defining a given number of base points on a contour of the object and in a first image of the object, the given number of base points defining facets whose vertices are the base points and which represent a first three dimensional shape of the object;
   defining each facet of the first shape by three segments wherein each segment is common to two adjacent facets;
   creating second rank points on the contour of the object by dividing the segments so as to constitute a second three-dimensional shape closer to the contour of the object than the first shape, the creation of each second rank point resulting in the creation of at least two new facets and at least three new segments;
   defining third or more rank points on the contour of the object by iteratively dividing each new segment into subsegments, so as to represent a third or more three-dimensional shape closer to the contour of the object than the second three-dimensional shape, the creation of the third or more rank points resulting in the creation of at least two additional new facets and at least three additional new segments, the third or more three-dimensional shape forming a final shape from the plurality of facets defined or created, the plurality of facets defining a plurality of triangular surfaces having known vertex points; and
   estimating the volume of the final shape using the plurality of triangular surfaces and making available to a user of medical imagery the estimation of the volume of the final shape which is representative of the volume of the three-dimensional organ or organ part.

2. The method according to claim 1 wherein the contour of the object is known from images taken along parallel sections.

3. The method according to claim 2 wherein each segment is divided by two.

4. The method according to claim 2 wherein the position of each second rank point is a function of the position of the first two adjacent facets.

5. The method according to claim 1 wherein a plurality of images provides a description of the three-dimensional contour.

6. The method according to claim 5 wherein each segment is divided by two.

7. The method according to claim 5 wherein the position of each second rank point is a function of the position of the first two adjacent facets.

8. The method according to claim 6 wherein the position of each second rank point is a function of the position of the first two adjacent facets.

9. The method according to claim 1 wherein each segment is divided by two.

10. The method according to claim 9 wherein the position of each second rank point is a function of the position of the first two adjacent facets.

11. The method according to claim 3 wherein the position of each second rank point is a function of the position of the first two adjacent facets.

12. The method according to claim 1 wherein the position of each of the second rank point is a function of the position of the first two adjacent facets.

13. The method according to claim 12 wherein the position of each second rank point is a function of the position of the first two adjacent facets.

14. The method according to claim 1 wherein the segments are divided into further additional subsegments until the change in volume for each further iteration resulting from a given division reaches a volume according to the desire of the operator or as defined by preset conditions.

15. The method according to claim 1 wherein the given number of base points is six.

16. The method according to claim 1 wherein any of the points of the three-dimensional shapes can be modified.

17. The method according to claim 1 wherein any of the points are defined manually.

18. The method according to claim 1 wherein there is a change in the calculated volume which defines a threshold below which the iterative division is stopped.

19. The method according to claim 1 wherein each segment or subsegment is divided by a perpendicular to the segment or subsegment.

20. The method according to claim 1 wherein the position of each of the second ranks is a function of the orientation of perpendiculars to the first two adjacent faces.

21. The method according to claim 1 wherein the segments are divided into further additional segments until the change in volume resulting from a given division is negligible.

22. The method according to claim 1 wherein subsequent to the calculation of the estimated volume of the object, the distribution of the density of the object in space is calculated.

23. The method according to claim 1 wherein the three-dimensional shape is a tetrahedron.

* * * * *

UNITED STATES PATENT AND TRADEMARK OFFICE
CERTIFICATE OF CORRECTION

PATENT NO. : 7,191,101 B2  Page 1 of 1
APPLICATION NO. : 09/368201
DATED : March 13, 2007
INVENTOR(S) : Jerome Knoplioch et al.

It is certified that error appears in the above-identified patent and that said Letters Patent is hereby corrected as shown below:

Column 1:
Line 34, after "of" (second occurrence), delete "films" and insert therefor --images--;
Line 52, after "two", insert --additional--;
      After "three", insert --additional--;

Column 3:
Line 37, after "of", delete ",";

Column 4:
Line 52, after "each", insert --of the --.

Signed and Sealed this

Twenty-sixth Day of June, 2007

JON W. DUDAS
*Director of the United States Patent and Trademark Office*